US012602500B2

(12) United States Patent
Barber et al.

(10) Patent No.: US 12,602,500 B2
(45) Date of Patent: Apr. 14, 2026

(54) ENCAPSULATING ACCESS ALGORITHMS FOR DATA PROCESSING ENGINES

(71) Applicant: INTERNATIONAL BUSINESS MACHINES CORPORATION, Armonk, NY (US)

(72) Inventors: Ronald J. Barber, San Jose, CA (US); Richard Sefton Sidle, Ottawa (CA); Viktor Giannakouris Salalidis, Ithaca, NY (US); Mir Hamid Pirahesh, San Jose, CA (US); Berthold Reinwald, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 18/439,073

(22) Filed: Feb. 12, 2024

(65) Prior Publication Data

US 2025/0258949 A1 Aug. 14, 2025

(51) Int. Cl.
*G06F 16/25* (2019.01)
*G06F 21/62* (2013.01)

(52) U.S. Cl.
CPC ........ *G06F 21/6218* (2013.01); *G06F 16/258* (2019.01)

(58) Field of Classification Search
CPC ..................... G06F 16/258; G06F 21/62–6236
See application file for complete search history.

(56) References Cited

U.S. PATENT DOCUMENTS

| | | | |
|---|---|---|---|
| 8,380,738 B2 | 2/2013 | Tatemura | |
| 10,503,923 B1 * | 12/2019 | Gupta | ................. G06F 21/6218 |
| 11,449,508 B2 | 9/2022 | Potharaju | |
| 2007/0011134 A1 * | 1/2007 | Langseth | .............. G06F 16/254 |
| 2019/0044953 A1 * | 2/2019 | Holsinger | ............. H04W 4/021 |

OTHER PUBLICATIONS

Armbrust et al. "Lakehouse: a new generation of open platforms that unify data warehousing and advanced analytics." Proceedings of CIDR. vol. 8. 2021,8 pages.

Nambiar et al., An Overview of Data Warehouse and Data Lake in Modern Enterprise Data Management. Big Data and Cognitive Computing 6.4, Nov. 7, 2022, 24 pages.

Orescanin et al., "Data lakehouse—a novel step in analytics architecture." 2021 44th International Convention on Information, Communication and Electronic Technology (MIPRO). IEEE, 202, pp. 1242-1246.

Shankaran et al. "The Gluten Open-Source Software Project: Modernizing Java-based Query Engines for the Lakehouse Era." 2023, 7 pages.

Simitsis et al., "The History, Present, and Future of ETL Technology." [Test-of-Time Award—Invited Talk], 2023, 10 pages.

* cited by examiner

*Primary Examiner* — Robert W Beausoliel, Jr.
*Assistant Examiner* — Nirav K Khakhar
(74) *Attorney, Agent, or Firm* — Seed Intellectual Property Law Group LLP

(57) ABSTRACT

A first data processing engine with an unpublished data format may store data on a shared storage system, where the data is in an unpublished data format. The first data processing engine may generate code, executable by a second data processing engine, where the code is configured to allow the second data processing engine to directly access a portion of the data without having access to knowledge of the unpublished data format.

20 Claims, 3 Drawing Sheets

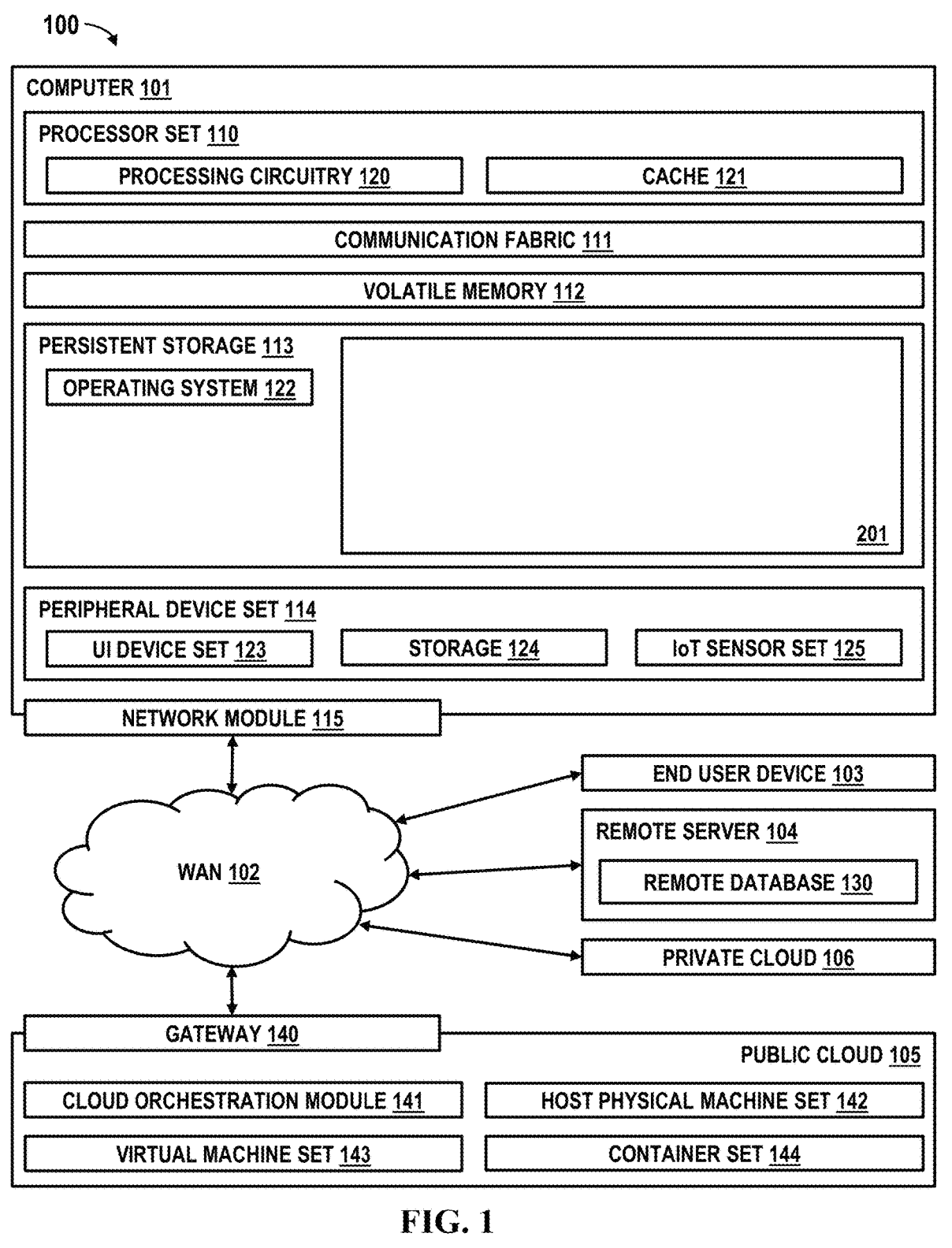

100

COMPUTER 101

PROCESSOR SET 110

PROCESSING CIRCUITRY 120 | CACHE 121

COMMUNICATION FABRIC 111

VOLATILE MEMORY 112

PERSISTENT STORAGE 113

OPERATING SYSTEM 122

201

PERIPHERAL DEVICE SET 114

UI DEVICE SET 123 | STORAGE 124 | IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 | HOST PHYSICAL MACHINE SET 142

VIRTUAL MACHINE SET 143 | CONTAINER SET 144

FIG. 1

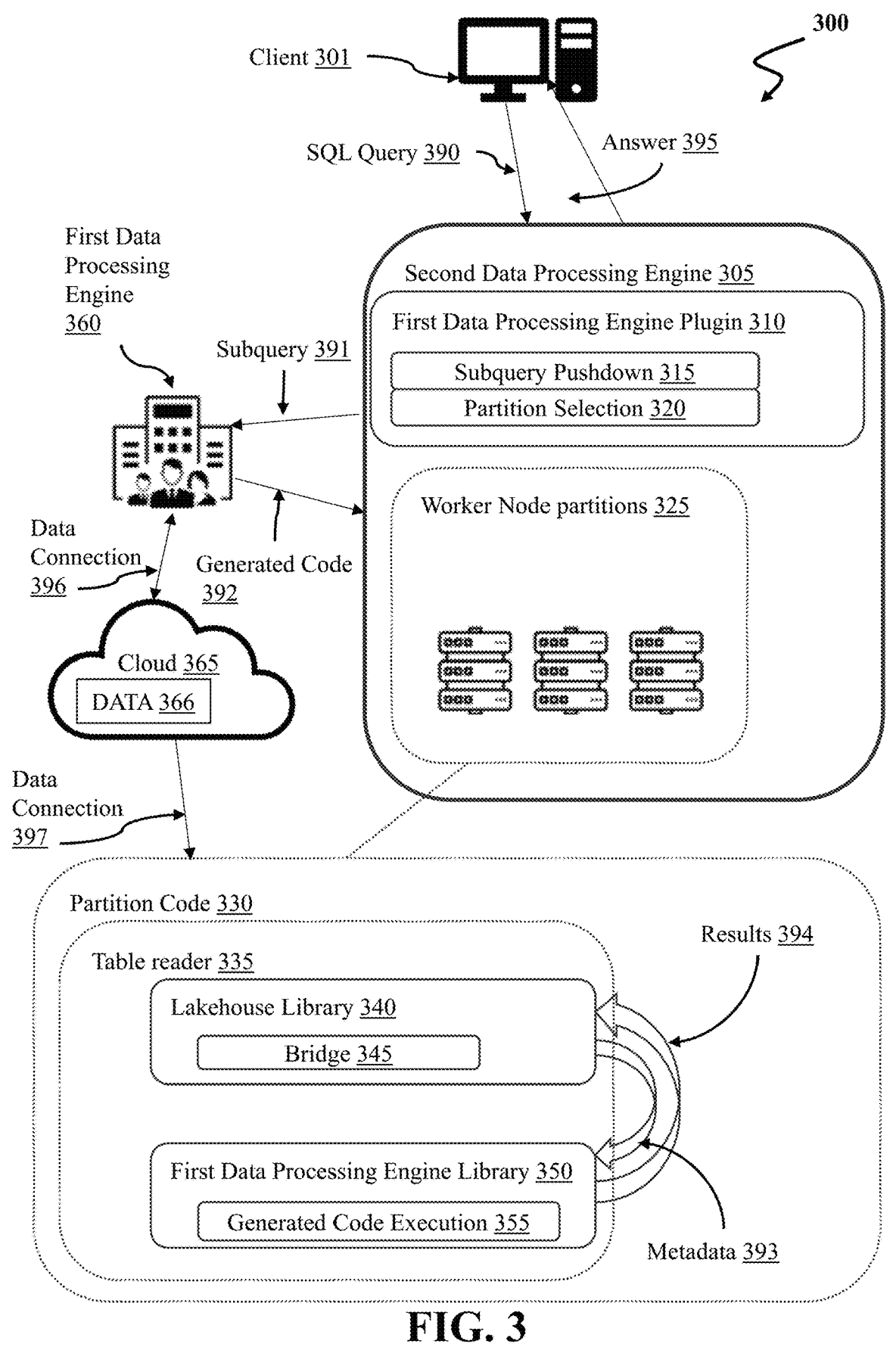

Client 301

300

SQL Query 390

Answer 395

First Data
Processing
Engine
360

Second Data Processing Engine 305

Subquery 391

First Data Processing Engine Plugin 310

Subquery Pushdown 315

Partition Selection 320

Worker Node partitions 325

Data
Connection
396

Generated Code
392

Cloud 365

DATA 366

Data
Connection
397

Partition Code 330

Results 394

Table reader 335

Lakehouse Library 340

Bridge 345

First Data Processing Engine Library 350

Generated Code Execution 355

Metadata 393

FIG. 3

ENCAPSULATING ACCESS ALGORITHMS FOR DATA PROCESSING ENGINES

BACKGROUND

Aspects of the present disclosure relate to data processing, more particular aspects relate to distributed data processing by heterogeneous systems.

Data is stored in an increasing variety and number of data systems. Data storage may include both traditional on-premise and cloud Database Management Systems (DBMS) which typically store data in highly specialized and optimized internal formats. More recently, data is also stored in cloud Data Lakehouse systems in published open formats.

A common requirement in such heterogeneous data system environments is to perform processing, such as SQL joins, on the combined data across multiple types of systems. For example, one type of data processing system referred to as a Data Lakehouse is often chosen as the system to process the combined data due to multiple factors. The Lakehouse systems commonly house a significantly higher proportion of the data and so it is more efficient to move data to them instead of vice versa. Lakehouse systems often provide more elastic and higher cluster scaling designed to support their larger volume of data and more varied workloads.

SUMMARY

Aspects of the present disclosure relate to a computer program product, system, and method for encapsulating access algorithms for data processing engines.

A first data processing engine with an unpublished data format may store data on a shared storage system, where the data is in an unpublished data format. The first data processing engine may generate code, executable by a second data processing engine, where the code is configured to allow the second data processing engine to directly access a portion of the data without having direct knowledge of the unpublished data format.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 1 illustrates an example computing environment, according to various embodiments of the present disclosure.

FIG. 3 illustrates an example system for encapsulating access algorithms for data processing engines, according to various embodiments of the present disclosure.

Figure 2:
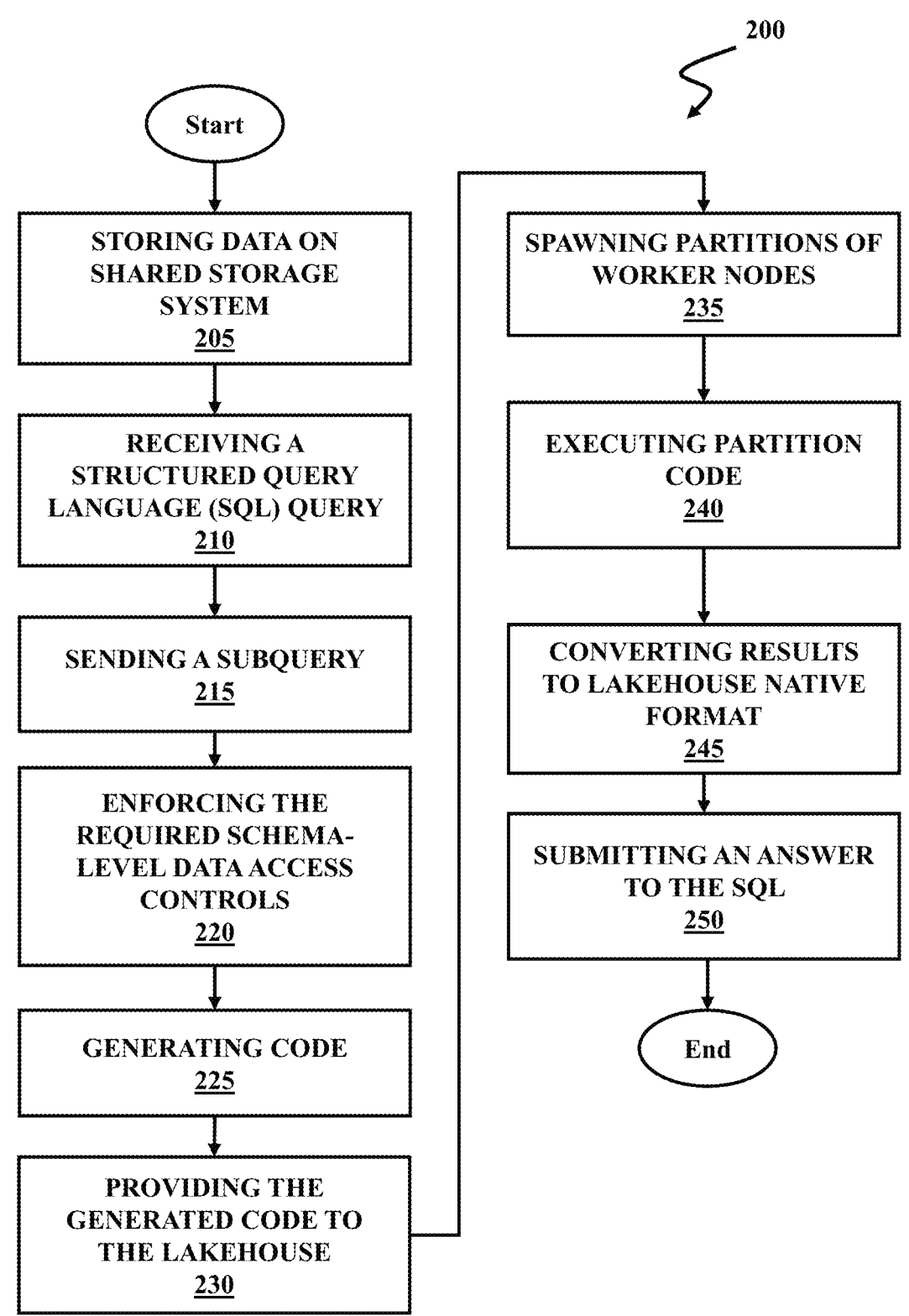
FIG. 2 illustrates an example method of encapsulating access algorithms for data processing engines, according to various embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to encapsulating access algorithms for data processing engines. While the present disclosure is not necessarily limited to such applications, various aspects of the disclosure may be appreciated through a discussion of various examples using this context.

A system, method, and/or computer program product are disclosed. The system may comprise a memory storing program instructions and a processor in communication with the memory, the processor being configured to execute the program instructions to perform processes. The method may be a computer-implemented method. The computer program product may comprise one or more computer readable storage media having program instructions collectively embodied therewith, the program instructions executable by one or more processors to cause the one or more processors to perform a method. The system, method, and/or computer program product may be configured to store, by a first data processing engine with an unpublished data format, data on a shared storage system, where the data is in an unpublished data format. The system, method, and/or computer program produce may be further configured to generate, by the first data processing engine, code, where the code is configured to allow a second data processing engine to directly access a portion of the data without having access knowledge of the unpublished data format. In some instances, the generated code may provide the technical advantage of allowing a second data processing engine to access and process data that normally only the first data processing engine could access. In some embodiments, the second data processing may have storage access to data stored by the first data processing engine and may require access to the data of the first data processing engine. In some embodiments, the second data processing engine may be a lakehouse. In some instances, a lakehouse may be a type of data management architecture that combines the capabilities of data lakes and data warehouses. The second data processing engine could be other types of systems with similar capabilities and/or need, as will be understood by one skilled in the art.

In some embodiments, the second data processing engine may split a data processing task by generating worker node partitions to process portions of the generated code in parallel. In some instances, the worker node partitions may allow faster processing of the data and better distribution of the processing.

In some embodiments, the second data processing engine may receive an SQL query from a client requesting access to the data. In some instances, by sending the SQL query directly to the second data processing engine, the SQL query may be processed by the second data processing engine.

In some embodiments, the second data processing engine may generate a subquery from the query prompting the first data processing engine to generate the code. In some instances, the subquery is a pushdown distilling the SQL query down to relevant requests for first data processing engine data.

In some embodiments, the partitions may process the generated code in batches. In some instances, batch processing provides a technical advantage of providing results to the SQL query as the results become available instead of waiting for all of the results to be completed. Batching can also enable the application of efficient vectorized data processing methods.

In some embodiments, the system, method, and/or computer program product may use a bridging component to allow the generated code to be processed by the second data processing engine. In some instances, bridging allows the second data processing engine to process data and receive results that it normally does not have the capability to process or read. The bridging component, which may be in the form of a software library, may execute the generated code to process the relevant first processing system data and produce the results of a subquery for further processing by the second processing system.

In some embodiments, the results of the code generation may include metadata with data size and data location. The metadata may be contained within the generated code or provided separately. In some instances, by providing metadata with the generated code, the second data processing engine is able to locate the data and properly allocate resources to processing of the data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as block 201 (e.g., code to enact method 200). In addition to block 201, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 201, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 201 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 201 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetiz-ing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Current methods to process data are deficient in a number of ways. The two main existing methods are transferring data at processing time and loading a copy of the data into the target processing system (e.g., Lakehouse) in an open format.

Although transferring the data from the Database Management Systems (DBMS) to the Lakehouse at processing time is feasible in principle, existing commonly used interfaces, such as Java® Database Connectivity (JDBC), do not scale well to large amounts of data. JDBC utilizes a row-major format, whereas the high performance first data processing engines in both the DBMS and Lakehouse systems are column-major and so transferring the data through the interface requires computationally expensive transformations and making multiple copies of the data. Furthermore, commonly used interfaces (e.g., JDBC) provide for few opportunities for parallelism in the data transfer. Data transfer is typically through one node of each of the source and target clusters. In order to provide parallelism, the Lakehouse must determine a partitioning of the data and divide the processing request into multiple requests for different data ranges. This is cumbersome and often not possible due to the data not being trivially partition-able by value (and also the range of values may not be known). These limitations of the most commonly used interfaces make it impractical for them to scale with the data size when the transferred results are large, for example when joining two large tables that are owned by the different systems. Parallel and column-major interfaces are designed to address the parallelism and performance limitations. However, these interfaces are not widely adopted due to their recency and the challenge (e.g., engineering cost) of changing the data systems (e.g., legacy and/or new) to use the interfaces. Currently, most major Lakehouse and DBMS systems use non-parallel interfaces such as JDBC to exchange data. However, even if the transferred data is small due to data reduction (aggregation) processing at the source, there is another significant issue with this strategy: the source system is burdened by additional processing to serve the external requests for data. These systems may not be designed or provisioned for such additional load. This leads to the second common method-loading a copy of the data into the target processing system (e.g., Lakehouse) in an open format.

Copying the data from the source system (e.g., DBMS) and loading it into the target processing system (e.g., Lakehouse) in an open format also has significant drawbacks: (i) The single point of access control to the data is lost, (ii) Copying the data may not be possible due to privacy controls and for sensitive data, (iii) Data currency is sacrificed. Processing the copy in the Lakehouse will not have access to the latest data. This lack of currency may be partially mitigated with incremental replication to reduce the window, (iv) It may not be possible to provide a transaction-consistent snapshot when processing the data copy in the target system since in some cases only the source system can provide this (e.g., may require access to a write-ahead log in the DBMS), and (v) Cost of duplicated data storage.

In some embodiments, this disclosure proposes a new strategy for data sharing and processing across systems. In some embodiments, the proposed strategy capitalizes on the wide adoption of generally accessible, cheap, and effectively limitless capacity cloud object storage and its use in Data Lakehouse systems. In some instances, the proposed strategy also utilizes the increasing move of traditional DBMS processing to the cloud. The cloud DBMS systems store their data in cloud object storage, with caching in fast local storage for performance, and continue to use proprietary internal data formats to provide the necessary high performance. In some instances, the use of unpublished internal formats applies equally to cloud-native (or "born in the cloud") DBMS systems.

In some embodiments, the disclosed system enables the possibility of a target processing system (e.g. Lakehouse) to directly access the data of the source system (e.g. DBMS) by overcoming the challenge of processing the internal format of that data when said data is accessible through a shared storage system.

In some embodiments, a method for enabling direct access and processing of data is described. In some embodiments, the method may be comprised of several components including an Access Preparation Service, an External Reader bridging component to execute generated code, and a Custom Pushdown. These components are described in more detail below.

Access Preparation Service (AP-Service): The source system (e.g., DBMS) exposes an AP-Service (new API) to perform the following in response to a data processing request from a target system (e.g., Lakehouse): (i) Enforces the required schema-level data access controls for the request, e.g., checking for authorization of the user to access the data in tables of a DBMS, (ii) Generates code that the target system may use to process the data directly. The generated code encapsulates knowledge of how to process the internal data format of the source system. The generated code is provided to the target system, (iii) Provides to the target system the location of the data (e.g., bucket location(s) in object storage), any credentials required to access it, and any additional metadata needed to process the data, (iv) Note that no data is processed by this service and so it does not burden the source system with any significant additional processing cost; however, secondary metadata structures such as synopses, may be interrogated to obtain location information.

External Reader: A new lightweight External Reader component (library) that the target system uses to invoke the generated code to process the data directly from its location in the shared storage (e.g., cloud storage) and in an unpublished data format of the first data processing engine. In some instances, the External Reader returns the results in the target system's native execution format (e.g., Arrow buffers) . For example, a DBMS system that uses code generation internally to improve query processing performance can be adapted to provide such an external capability.

Custom Pushdown: An extension to the federated layer of the target system which determines what portion of the data processing task can be processed by the External Reader component. For example, this will typically include a subset of Structured Query Language (SQL) selection, projection, semi-joins and partial aggregation. In some embodiments, the SQL compiler component of existing Lakehouse systems include such extensible federated database capabilities can be used to determine which portions of queries can be "pushed down" to the various external source data systems that they support (e.g., typically using JDBC).

Previously systems have provided a separate heavyweight library for the data source that includes portions of their implementations (e.g., those that support the subset of SQL capability listed above). Traditionally, this approach would require many of the components of the source system to be implemented (e.g., the SQL compiler, optimizer, portions of the query engine, and/or data layers). Furthermore, these systems are typically monolithic with many internal dependencies (and intentionally so for performance reasons) and previously it was not practically possible to separate portions of these source processing systems. In some embodiments, the methods described herein overcomes this challenge. For example, the AP-Service can use the existing SQL compiler and optimizer of the source system to generate the code. The generated code can be fully specialized to the data access request (e.g., SQL query), encapsulating only the portions of the runtime and data layers as are needed for its processing.

FIG. 2 depicts an example method 200 for encapsulating access algorithms for data processing engines. Operations of method 200 may be enacted by one or more computing environments such as the system described in FIG. 1 above and/or executed by one or more components of example system 300 from FIG. 3. To better illustrate the relationship between FIG. 2 and FIG. 3, operations of FIG. 2 will be described in combination with components of FIG. 3. However, this is for illustrative purposes and is not limiting. The operations of FIG. 2 can likewise be implemented by components other than those discussed below with respect to FIG. 3.

Method 200 begins with operation 205 of first data processing engine 360 (e.g., an Enterprise Data Warehouse (EDW), source system, DBMS, etc.) storing data on shared storage system such as Cloud 365 through data connection 396. In some instances, cloud 365 is used as an example, but storage may be in other systems as understood by one skilled in the art. In some instances, first data processing engine is used as an example, but other types of entities/systems may be used as will be understood by one skilled in the art. In some embodiments, data may be in a format accessible to the first data processing engine. For example, the data may be stored in a proprietary format (e.g., proprietary/internal/unpublished/private), encrypted, or in a format that the first data processing engine uses.

Method 200 continues with operation 210 of second data processing engine 305 receiving a Structured Query Language (SQL) query 390 from client 301. In some instances, second data processing engine 305 is used as an example, but other types of entities/systems may be used as will be understood by one skilled in the art. In some embodiments, a client may include application servers, web applications, desktop applications, mobile applications, database management tools, command-line interfaces, APIs, middleware or integration components, automated jobs or scripts, reporting tools, and/or another system.

In some embodiments, the SQL query may be a request to access data that is stored by first data processing engine 360. In some instances, SQL query 390 may also request to access data stored by second data processing engine 305. In some embodiments, second data processing engine 305 may not have information related to where the data is stored, the format it is in, and/or any encryption used to encrypt the data.

Method 200 continues with operation 215 of the shared storage system sending a subquery 391 to first data processing engine 360. In some embodiments, the subquery 391 is examined by the second data processing engine 305. In some embodiments, the second data processing engine 305 determines that second data processing engine 305 does not have the understanding to deal with at least a portion of the data. In some embodiments, SQL query 390 may access both second data processing engine 305 data and first data processing engine 360 data. In some embodiments, subquery 391 is routed to a first data processing engine plugin 310. In some embodiments, first data processing engine plugin 310 recognizes what portions of the data require first data processing engine access (e.g., data from one or more first data processing engine tables). In some embodiments, SQL query 390 may identify first data processing engine owned data and generate one or more subqueries (for example, subquery 391) to prompt first data processing engine 360 to generate code. In some embodiments, each SQL query 390 may be used to generate several subqueries 391. In some embodiments, subqueries 391 may also have credentials required for the access from the client and/or the second data processing engine.

In some embodiments, subquery pushdown component 315 may be an extension to the federated layer of the target system which determines what portion of the data processing task (e.g., SQL query 390) may be processed by generated code 392 (e.g., code generated by first data processing engine 360 for second data processing engine 305 to process data in an unpublished format of first data processing engine 360). For example, the portion of the data may include that required by a subset of SQL selection, projection, semi-joins and partial aggregation.

In some embodiments, first data processing engine plugin 310 may create worker node partitions 325. In some embodiments, worker node partitions 325 may be divided to process portions of generated code 392 with partition selection 320. In some embodiments, worker node partitions 325 may be divided by the amount of work to be processed (e.g., data size or processing required).

Method 200 continues with operation 220 of the first data processing engine enforcing the required schema-level data access controls for the request (e.g., checking for authorization of the user to access the data in tables of a DBMS).

Method 200 continues with operation 225 where first data processing engine 360 generates code (e.g., generated code 392) for second data processing engine 305 to process the data directly. In some embodiments, generated code 392 encapsulates knowledge of how to process the internal data format of first data processing engine 360. Data may be in a proprietary and/or encrypted format which second data processing engine 305 does not have the ability to read. In some embodiments, the generated code 392 may contain data-level access control enforcement based on the requesting user.

In some embodiments, code generation can be to source code (e.g., C++). In some embodiments, code generation can be to a compiler intermediate code representation, such as a low-level programming language that serves as an intermediate step in the compilation process within a LLVM (Low-Level Virtual Machine) compiler infrastructure available to the second data processing engine 305. In some embodiments, code generation may be object code suitable for target system (using cross-compilation). In some embodiments, the AP-Service of the source system can perform additional lightweight processing to reduce the work required by a processing system of second data processing engine 305 (e.g., by using its internal data structures such as a synopsis to reduce the data that must be processed by second data processing engine 305). In some embodiments, the AP-Service may make first data processing engine 360 internal data structures available to generated code 392 via the returned metadata supplied with generated code 392. In some embodiments, commonly used metadata may be provided once by the source first system to the target second system where it can be cached for ongoing usage.

In some embodiments, to enable second data processing engine 305 to provide a transactionally consistent view of the source system's data, first data processing engine 360 may return the snapshot point (e.g., timestamp) up to which generated code 392 may process the data. In some instances, no uncommitted data beyond the snapshot will be returned by the generated code 392 to second data processing engine 305.

In some embodiments, generated code 392 may include metadata such as estimated data size (e.g., estimated row count) and data locations.

Method 200 continues with operation 230 of providing, to the second data processing engine 305 the generated code and other information for processing the SQL Query 390. In some embodiments, the other information may include the location of the data (e.g., bucket location(s) in object storage), any credentials required to access the data, and any additional metadata needed to process the data.

In some embodiments, the generated code 392 may write directly into the execution data buffers of the second data processing engine 305 in its preferred format (e.g., the popular Arrow column-major format), providing true zero-copy processing and increasing performance.

Method 200 continues with operation 235 of spawning partitions of worker nodes (owned or operated by the second data processing engine) to process the generated code. In some embodiments, partitions may be directed to portions of the code, portions of data, or particular subqueries. In some embodiments, worker node partitions 325 may be divided by the amount of work to be processed (e.g., data size or processing required). In some embodiments, partitions may be run in parallel. In some embodiments, first data processing engine plugin 310 may create worker node partitions 325. In some embodiments, worker node partitions 325 may be divided to process portions of generated code 392. Three nodes are depicted in FIG. 3, however, more or fewer partitions may be created.

Method 200 continues with operation 240 where worker node partitions 325 execute partition code 330 which table reader 335 executes. In some embodiments, partition code 330 represents a portion of generated code 392 that a particular worker node executes. In some embodiments, worker node partitions call the generated code 392 to be executed. In some embodiments, portions of table reader 335 may exist in second data processing engine 305 and other portions may be from generated code 392 (e.g., 5% of the table reader 335 may exist in the second data processing engine 305 while 95% of the table reader 335 may be derived from generated code 392). For example, the basic structure of table reader 335 may be stored in second data processing engine 305 to use for multiple generated codes, when the basic structure of table reader 335 may be reused.

In some embodiments, table reader 335 uses bridge 345 (for example, JNI (Java® Native Interface)) of second data processing engine library 340 to transition from the code from the second data processing engine native language (for example, Java®) to the first data processing engine native language (for example, C++) which is the operating environment of the generated code. In some instances, where both systems use the same language, the transition may not be required. In some instances, the generated code 392 is executed directly by second data processing engine library 350.

In some embodiments, worker node partitions 325 then perform the generated code execution 355 in second data processing engine library 305. In some embodiments, the generated code 392 may access first data processing engine data 366 through data connection 397 and perform one or more operations as required by SQL query 390. In some embodiments, generated code 392 execution may perform pushdown on the result to limit further processing required by second data processing engine 305. For example, in an instance where SQL query 390 requires an average of data entries, the execution may compute the average instead of providing the data entries and having second data processing engine 305 perform the average computation.

In some embodiments, multiple instances of the generated code 392 may be created (e.g., by dividing generated code 392 into sections) and used by worker node partitions 325 to provide parallel execution of the processing task. In some embodiments, the data location information may be used to provide flexible partitioning of the input data for parallelism. In some instances, the partitioning may be statically determined at processing startup or be dynamic (e.g., work stealing), thereby enabling second data processing engine 305 to provide access to the source system's data at varying levels of parallelism independent of any parallelism limit of the source first system.

In some embodiments, table reader 335, using the generated code 392, may simply return selected columns or perform additional processing such as filtering, computation, semi-joins, and/or partial aggregation before returning results.

In some instances, data-level access controls (e.g., at the column and row level) may be enforced by the generated code 392.

Method 200 continues with operation 245 of converting results 394 to second data processing engine native format and providing the converted results to second data processing engine 305 through second data processing engine library 340. In some embodiments, operations 240 and 245 may be performed continuously in batches. For example, when a worker node partition finishes a particular batch of data it may provide second data processing engine 305 with the result and continue working on other portions of the data.

Method 200 continues with operation 250 of submitting an answer to the SQL query 390 to client 301. In some embodiment, answer 395 may be performed in batches as sections of the SQL query are completed.

FIG. 3 depicts an example system 300 for encapsulating access algorithms for data processing engines. System 300 includes client 301, first data processing engine 360, second data processing engine 305, and data in cloud storage 365. In some embodiments, first data processing engine 360 is connected to cloud 365 through data connection 396 and second data processing engine 305 is connected to cloud 365 through data connection 397. In some embodiments, first data processing engine 360 may store first data processing engine data 366 on cloud 365 through data connection 396 and second data processing engine 305 may retrieve first data processing engine data 366 through data connection 397.

In some embodiments, client 301 may send SQL query 390 to second data processing engine 305. In some embodiments, second data processing engine 305 may use first data processing engine plugin 310 to generate subquery 391. In some embodiments, subquery pushdown component 315 may be an extension to the federated layer of the target first system which determines what portion of the data processing task (e.g., SQL query 390) may be processed by generated code 392 (e.g., code generated by first data processing engine 360 for second data processing engine 305 to process data in an unpublished (e.g., native) format of first data processing engine 360).

In some embodiments, first data processing engine 360 may generate code 392 based on subquery 391. In some embodiment, second data processing engine 305 may receive generated code 392 and first data processing engine plugin 310 may use partition selection 320 to generate worker node partitions 325 to process generated code 392.

In some embodiments, first data processing engine 360 may be a centralized repository for structured data, offering high-performance querying and analysis capabilities. In some embodiments, second data processing engine 305 may be used to store and process structured and unstructured data for data analytics. In some embodiments, first data processing engine 360 and second data processing engine 305 may be used together to for comprehensive data management and analytics, with the second data processing engine 305 extending the capabilities of first data processing engine 360 in handling diverse data types and analytical use cases efficiently.

In some embodiments, partition code 330 represents a portion of generated code 392 that a particular worker node executes. In some embodiments, table reader 335 may be software tool that parses and extracts structured data from tabular formats, enabling its interpretation and integration into other systems or applications for further analysis and processing. In some instances, table reader 335 utilizes both second data processing engine library 340 and first data processing engine library 350. In some instances, second data processing engine library 340 includes a collection of resources, tools, or frameworks designed for building and managing data in second data processing engine 305 including bridge 345. In some instances, bridge 345, facilitates the transfer or integration of data between a native language of second data processing engine 305 and an unpublished data format (e.g., native language with or without encryption) of first data processing engine 360. In some embodiments bridge 345 is used to send metadata 393 from generated code 392 to first data processing engine library 350. In some instances, first data processing engine library 350 includes a collection of resources, tools, or frameworks designed for processing generated code 392. In some embodiments, first data processing engine library 360 may perform generated code execution 355 to generate results 394 which second data processing engine 305 compiles into answer 395.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:

a memory storing program instructions; and a processor in communication with the memory, the processor being configured to execute the program instructions to perform processes comprising:

storing, by a first data processing engine with an unpublished data format, data on a shared storage system; and generating, by the first data processing engine, executable code, wherein the code is configured to allow a second data processing engine to directly access and read a portion of the data without having access to knowledge of the unpublished data format.

2. The system of claim 1, wherein the memory stores further program instructions, and wherein the processor is configured to execute the further program instructions to perform the processes further comprising:

generating worker node partitions to process portions of the generated code in parallel.

3. The system of claim 1, wherein the memory stores further program instructions, and wherein the processor is configured to execute the further program instructions to perform the processes further comprising:

receiving a SQL query from a client requesting access to the data.

4. The system of claim 3, wherein the memory stores additional program instructions, and wherein the processor is configured to execute the additional program instructions to perform the processes further comprising:

generating a subquery from the query prompting the first data processing engine to generate the code.

5. The system of claim 1, wherein the memory stores further program instructions, and wherein the processor is configured to execute the further program instructions to perform the processes further comprising:

processing the generated code in batches.

6. The system of claim 1, wherein the memory stores further program instructions, and wherein the processor is configured to execute the further program instructions to perform the processes further comprising:

bridging the generated code to be processed by the second data processing engine.

7. The system of claim 1, wherein the generated code comprises metadata with data size and data location.

8. A method comprising:

storing, by a first data processing engine with an unpublished data format, data on a shared storage system; and generating, by the first data processing engine, executable code, wherein the code is configured to allow a second data processing engine to directly access and read a portion of the data without having access to knowledge of the unpublished data format.

9. The method of claim 8, wherein the method further comprises:

generating worker node partitions to process portions of the generated code in parallel.

10. The method of claim 8, wherein the method further comprises:

receiving a SQL query from a client requesting access to the data.

11. The method of claim 10, wherein the method further comprises:

generating a subquery from the query prompting the first data processing engine to generate the code.

12. The method of claim 8, wherein the method further comprises:

processing the generated code in batches.

13. The method of claim 8, wherein the method further comprises:

bridging the generated code to be processed by the second data processing engine.

14. The method of claim 8, wherein the generated code contains metadata with data size and data location.

15. A computer program product comprising one or more computer readable storage media having program instructions collectively embodied therewith, the program instructions executable by one or more processors to cause the one or more processors to perform a method, the method comprising:

storing, by a first data processing engine with an unpublished data format, data on a shared storage system; and generating, by the first data processing engine, executable code, wherein the code is configured to allow a second data processing engine to directly access and read a portion of the data without having access to knowledge of the unpublished data format.

16. The computer program product of claim 15, further comprising additional program instructions collectively stored on the one or more computer readable storage media and configured to cause the one or more processors to perform the method further comprising:

generating worker node partitions to process portions of the generated code in parallel.

17. The computer program product of claim 15, further comprising additional program instructions stored on the one or more computer readable storage media and configured to cause the one or more processors to perform the method further comprising:

receiving a SQL query from a client requesting access to the data.

18. The computer program product of claim 17, further comprising additional program instructions stored on the one or more computer readable storage media and configured to cause the one or more processors to perform the method further comprising:

generating a subquery from the query prompting the first data processing engine to generate the code.

19. The computer program product of claim 15, further comprising additional program instructions stored on the one or more computer readable storage media and configured to cause the one or more processors to perform the method further comprising:

processing the generated code in batches.

20. The computer program product of claim 15, further comprising additional program instructions stored on the one or more computer readable storage media and configured to cause the one or more processors to perform the method further comprising:

bridging the generated code to be processed by the second data processing engine.

* * * * *